US012257691B2

(12) United States Patent
Cloutier et al.

(10) Patent No.: US 12,257,691 B2
(45) Date of Patent: Mar. 25, 2025

(54) COLLAPSIBLE SUPPORT

(71) Applicant: 2446914 ONTARIO INC., Cumberland (CA)

(72) Inventors: Alexandre Cloutier, Cumberland (CA); Matthieu St-Arnaud, Orleans (CA); Simon Bélanger, Orleans (CA); Alexandre Dumas, Gatineau (CA)

( * ) Notice: Subject to any disclaimer, the term of this patent is extended or adjusted under 35 U.S.C. 154(b) by 1029 days.

(21) Appl. No.: 17/129,136

(22) Filed: Dec. 21, 2020

(65) Prior Publication Data

US 2021/0187724 A1 Jun. 24, 2021

(30) Foreign Application Priority Data

Dec. 20, 2019 (CA) ...................................... 3065702

(51) Int. Cl.
*B25H 1/04* (2006.01)
*B25H 1/00* (2006.01)

(52) U.S. Cl.
CPC ............... *B25H 1/04* (2013.01); *B25H 1/005* (2013.01)

(58) Field of Classification Search
CPC ........ B25H 1/04; B25H 1/005; B25H 1/0035; B25H 1/06; B25H 1/08; B25H 1/10; A47B 3/0818; A47B 2003/0824; Y10S 269/901
See application file for complete search history.

(56) References Cited

U.S. PATENT DOCUMENTS

| | | | | |
|---|---|---|---|---|
| 3,212,788 A * | 10/1965 | Adler | B62B 7/12 280/643 |
| 4,191,111 A * | 3/1980 | Emmert | A47B 3/0916 248/440 |
| 4,681,305 A * | 7/1987 | Green | B25B 1/22 269/88 |
| 4,864,941 A * | 9/1989 | Goulter | B25H 1/04 269/208 |
| 5,954,156 A * | 9/1999 | Cooke | B25H 1/06 182/225 |
| 7,243,896 B2 * | 7/2007 | Zhang | F16M 11/38 248/676 |
| 7,255,355 B2 * | 8/2007 | Chisholm | B25H 1/04 248/676 |
| 7,588,255 B2 * | 9/2009 | Katz | B62B 1/12 280/47.27 |
| 9,415,503 B1 * | 8/2016 | Ferragonio | B25H 1/04 |
| 10,562,174 B2 * | 2/2020 | Omry | A47B 3/08 |
| 10,864,625 B2 * | 12/2020 | Hanlon | B25H 1/06 |
| 11,648,659 B2 * | 5/2023 | Hanlon | B25H 1/14 182/153 |
| 2019/0264862 A1 * | 8/2019 | Hoyle | A47B 13/003 |

* cited by examiner

*Primary Examiner* — Bradley Duckworth
(74) *Attorney, Agent, or Firm* — Andrews Robichaud PC; Alessandro Colonnier

(57) ABSTRACT

The present disclosure provides for a stand, the stand further comprised of a pair of collapsible supports for a surface such as a work bench or a press brake. The collapsible supports are secured to the bench or press brake by means of securing clamps. The collapsible supports each have a pair of legs terminating in a removeable and sliding wheel and also have telescopic arms to allow for the legs to independently pivot one from the other. An actuating mechanism is also disclosed to release and lock the legs, the actuating mechanism providing a range of motion between a first extended position to a second folded position.

13 Claims, 17 Drawing Sheets

COLLAPSIBLE SUPPORT

FIELD

The invention relates to the field of mechanical accessories, and more specifically to collapsible supports to facilitate work bench or press brake storage and transportation.

BACKGROUND

Portable press brakes are commonly used by specialized contractors to finish different aspects of exterior finishes on all types of buildings and structures. The portable brake industry has been the same for many years with limited accessories that can be offered either with the brake or as an "add-on" or "retrofit" to improve the efficiency, accuracy, productivity, storage or transportation of the conventional portable brake. The lack of accessories means that many unnecessary steps need to be completed to achieve a result that could be otherwise realised in a timelier manner.

One accessory that offers some of those added benefits is a stand to facilitate the transportation and storage of the press brake.

SUMMARY

In an aspect, the present disclosure provides a collapsible support comprising: a securing clamp to secure the support to a surface; at least two legs secured to the securing clamp, the at least two legs to support and transport the surface; at least two telescopic arms, each one of the at least two telescopic arms secured to each one of the two legs to allow the at least two legs to pivot about an axis; and, an actuating mechanism connected to the at least two telescopic arms to lock and release the at least two legs, wherein the support has a range of motion in between a first extended position to a second folded position.

In another aspect, the present disclosure provides a sliding bracket for use with a press brake comprising: a hook portion to hook into a portion of the press brake; a base portion extending from the hook portion to mate with the portion of the press brake; and, a front portion attached to the base portion, the front portion further comprised of a dowel portion extending therefrom, the dowel portion configured to receive a handle.

In yet another aspect, the present disclosure provides an improved tool holder comprising: a lower clamp to tighten onto a press brake; a main body secured to the clamp to provide various positions of the improved tool holder; and, an upper hook secured to the main body, the upper hook further comprised of at least one catch to receive at least one accessory of the press brake.

BRIEF DESCRIPTION OF THE DRAWINGS

The following figures serve to illustrate various embodiments of features of the disclosure. These figures are illustrative and are not intended to be limiting.

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

Figure 1:
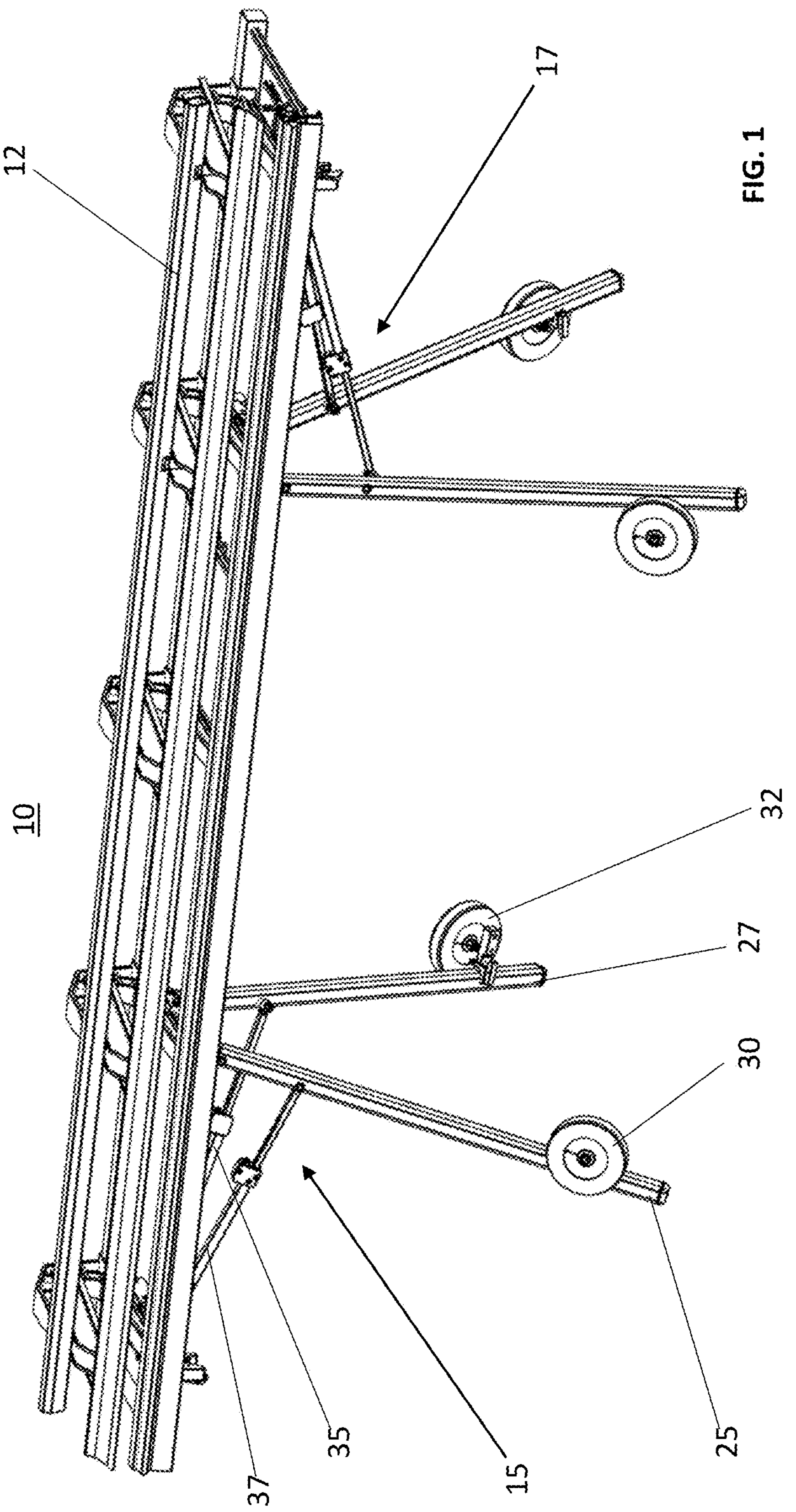
FIG. 1 is a perspective view of a stand secured to a press brake according to an embodiment of the present disclosure.
Figure 2:
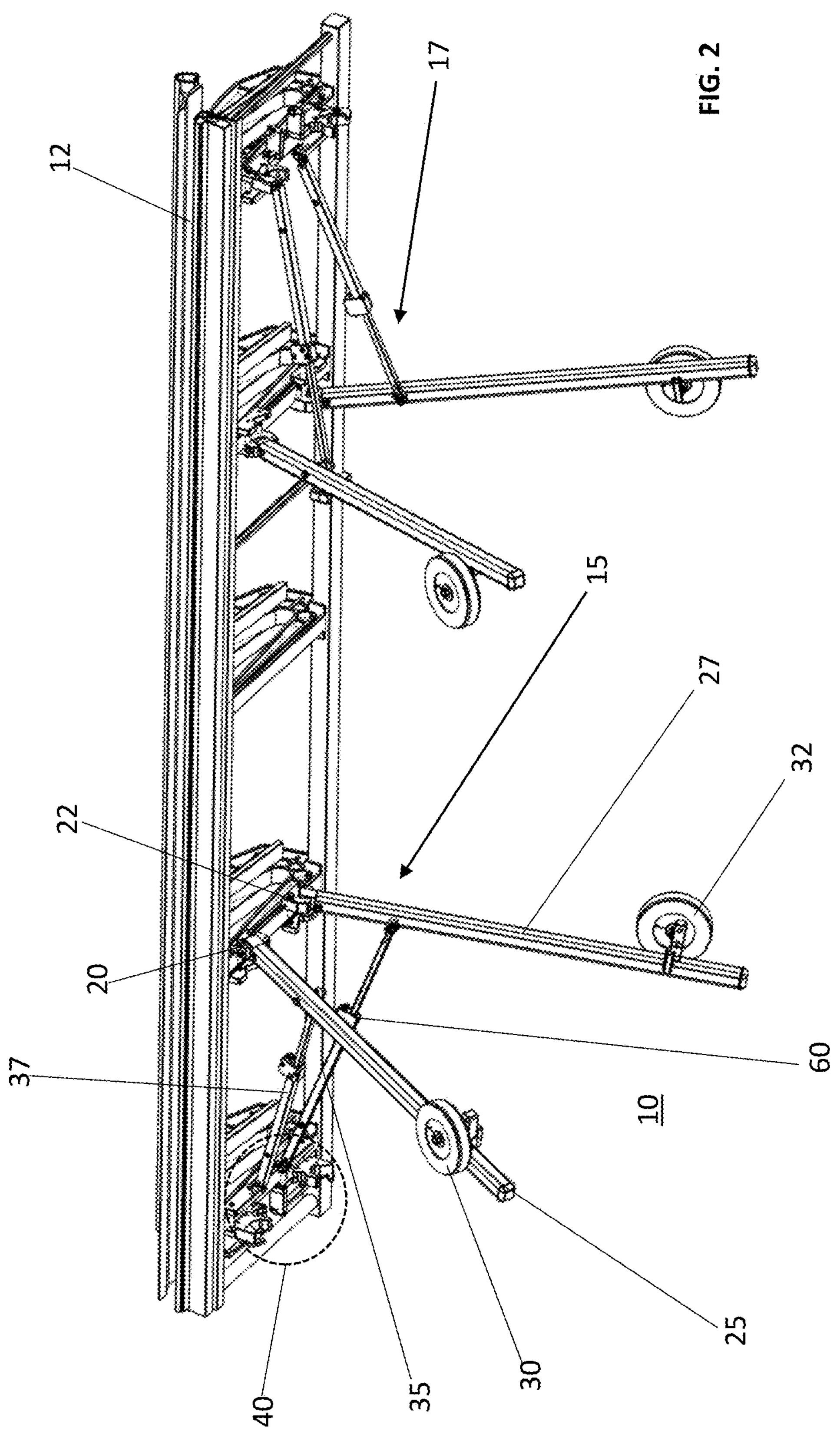
FIG. 2 is an underside perspective view of the stand secured to the press brake according to an embodiment of the present disclosure.

With reference to FIGS. 1 and 2 and according to an embodiment of the present disclosure, a stand 10 is shown secured to a press brake 12. Although the stand 10 is shown secured to a press brake, a worker skilled in the art would appreciate that the stand could be secured to other types of surfaces, such as a work bench, without departing from the scope of the disclosure. As shown, the stand 10 is further comprised of two collapsible supports 15, 17. A worker skilled in the art would appreciate that although two collapsible supports 15, 17 are shown, only a single collapsible support 15 could be possible. Where only a single collapsible stand 15 is provided, the press brake 12 would need a means to support and transport it at the other end, such as a pair of wheels. As the collapsible supports 15, 17 are identical, the present disclosure will describe the components of the first collapsible support 15, with a worker skilled in the art understanding that the components are mirrored on the second collapsible support 17. The collapsible support 15 is further comprised of a pair of securing clamps 20, 22 to clamp onto and secure the collapsible support 15 to the press brake 12. A worker skilled in the art would appreciate that although two securing clamps 20, 22 are shown, a single longitudinal clamp could also be utilized without departing from the scope of the disclosure. The collapsible support 15 is further comprised of a pair of legs 25, 27 that are secured to the securing clamps 20, 22, each of the legs 25, 27 having its own removable wheel 30, 32 to transport and support the press brake 12. A pair of telescopic arms 35, 37 are provided, with one end of the telescopic arms 35, 37 secured to the legs 25, 27, while the other opposite end of the arms 35, 37 secured to an actuating mechanism 40. The actuating mechanism 40 serves to quickly and easily releasably lock the pair of legs 25, 27 from the collapsible support 15.

Figure 3:
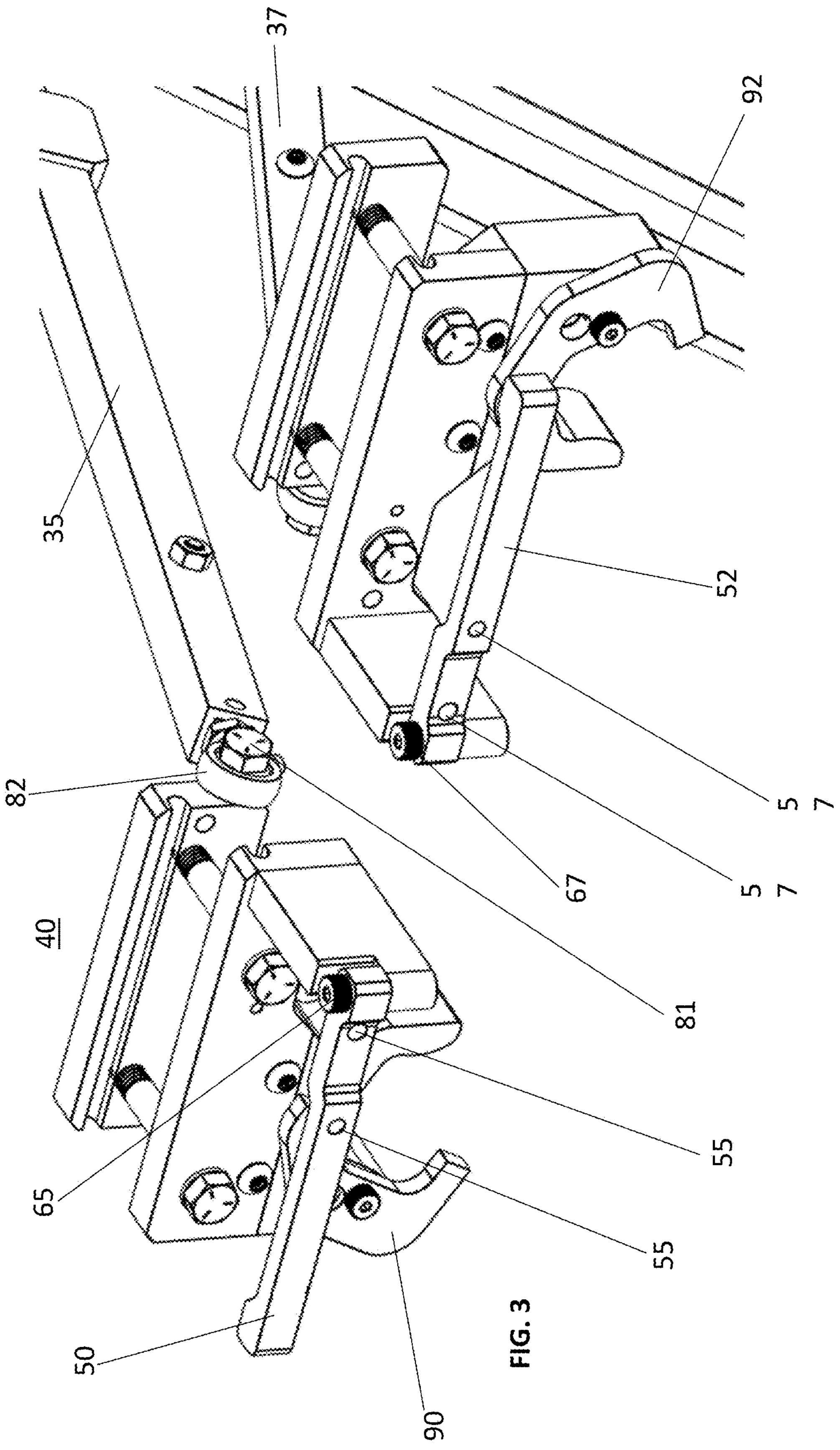
FIG. 3 is an enlarged perspective view of an actuating mechanism of a collapsible support of the stand in an extended position, according to an embodiment of the present disclosure.
Figure 4:
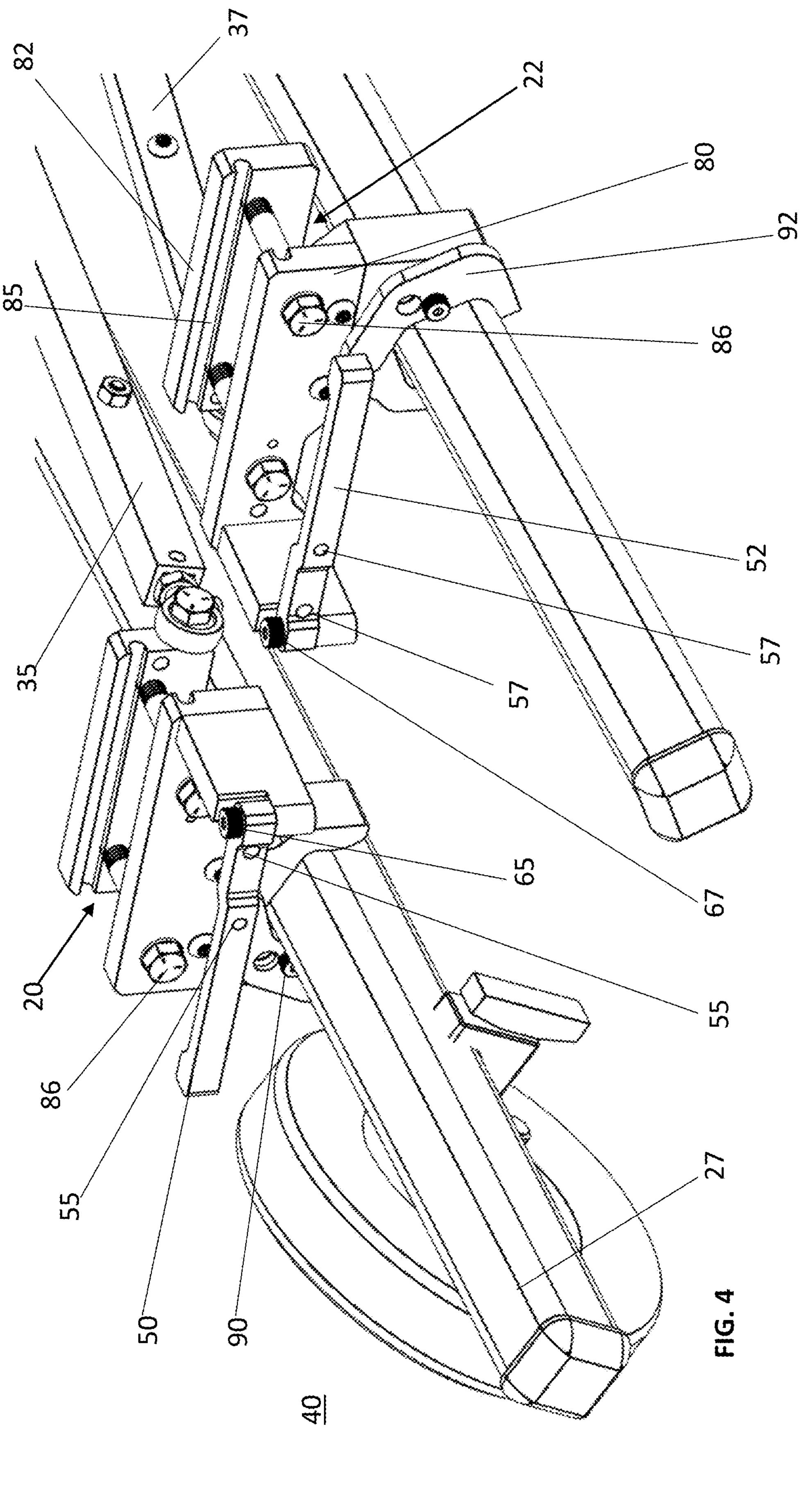
FIG. 4 is an enlarged perspective view of the actuating mechanism of the collapsible support of the stand in a folded position, according to an embodiment of the present disclosure.
Figure 5A:
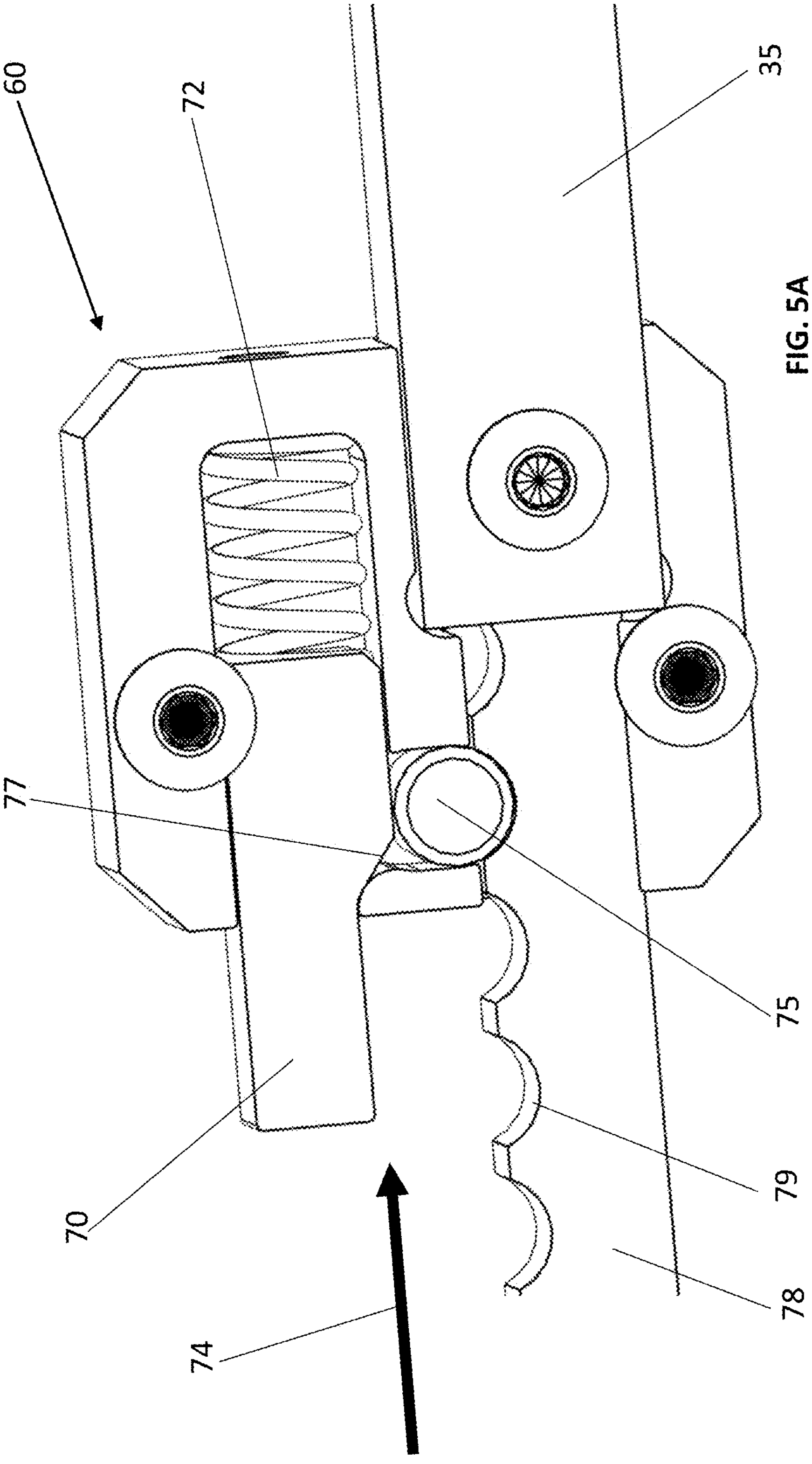
FIG. 5A is an enlarged perspective view of a releasing bracket of the collapsible support in a locked position, according to an embodiment of the present disclosure.
Figure 5B:
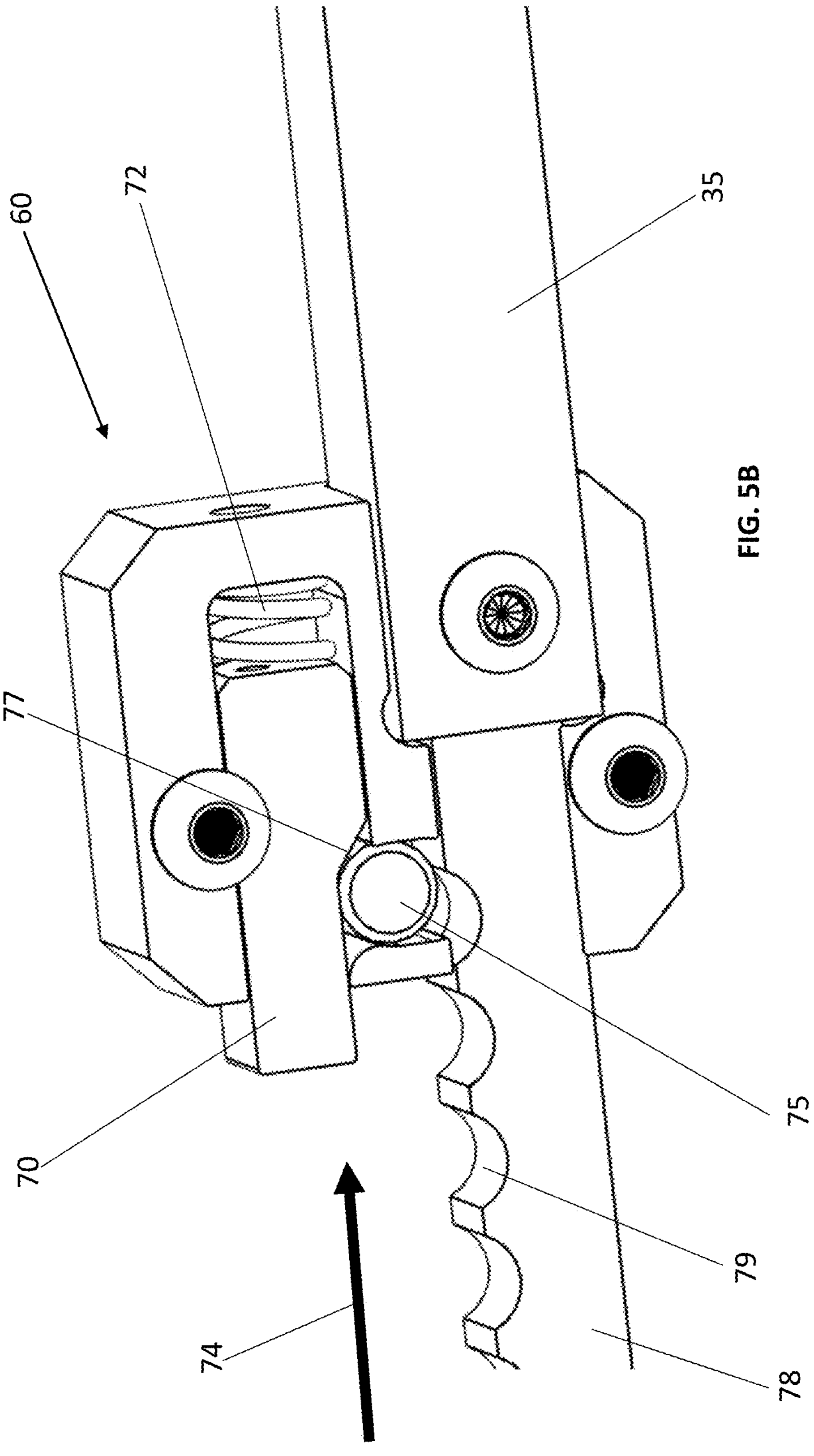
FIG. 5B is an enlarged perspective view of a releasing bracket of the collapsible support in an unlocked position, according to an embodiment of the present disclosure.

With reference to FIGS. 3, 4, 5A and 5B and according to an embodiment of the present disclosure, the actuating mechanism 40 is shown preferably comprised of a pair of handles 50, 52, each handle 50, 52 having apertures 55, 57, respectively, through which wires (not shown) are fitted. The first end of the wires (not shown) terminates at a pair of releasing brackets 60 (only a single releasing bracket 60 is shown), while the second, opposite end of the wires (not shown) terminates at a plungers (not shown) of claws 90, 92. While the releasing bracket 60 is shown secured to the arm 35, a worker skilled in the art would appreciate that there is a second releasing bracket identically secured to the arm 37. The releasing bracket 60 is further comprised of an angular slider 70, spring 72 and locking peg 75. A worker skilled in the art will appreciate that the releasing bracket 60 is shown in a locked position in FIG. 5A and an unlocked position in FIG. 5B. When the handles 50, 52 are pulled, they pivot about dowels 65, 67. Pivoting of the handle 50 pulls on the wire (not shown) in apertures 55, which correspondingly pulls on the releasing bracket 60. As the wire (not shown) is secured to the slider 70 within the releasing bracket 60, the slider 70 moves in the direction of arrow 74, which compresses the spring 72 until the peg 75 moves upwardly and into the space behind the sloped surface 77 of the slider 70 as specifically shown in FIG. 5B. The releasing bracket 60 is no longer in its locked position, and an inner rod 78 can slide into or out of the telescopic arm 35. A worker skilled in the art would appreciate that FIG. 3 shows a portion of the collapsible support in a first extended position, while FIG. 4 shows a portion of the collapsible support in a second folded position. Other positions in between those shown in FIGS. 3 and 4 are possible. Indeed, the inner rod 78 is comprised of a plurality of grooves 79 along the length of the inner rod 78. The grooves 79 are designed to mate with the locking peg 75 to lock the arm 35 in a desired position. As such, a user can pull on the handle 50 and slide the inner rod 78 in and out of the arm 35 until a desired position is achieved. Once the handle 50 is released, the locking peg 75 is pushed downwardly into one of the grooves 79, and therefore locks the arm 35 in place. A bolt 81 is provided, fastened through a ring 82 of the arm 35 and into the actuating mechanism 40. As such, the arm 35 pivots about bolt 81 relative to the actuating mechanism 40 when the handle 50 is pulled. As the arm 35 is also pivotally connected to the leg 27, compression and retraction of the arm 35 will necessarily fold and extend the leg 27, respectively. A worker skilled in the art would appreciate that although only the functioning of handle 50 in relation to releasing bracket 60 and arm 37 is described, handle 52 would function in exactly the same manner with a second releasing bracket (not shown) and arm 35. As such, each one of the arms 35, 37 can compress and retract independently one from the other, and correspondingly fold and extend legs 27, 25, respectively. This allows a multitude of advantageous positions of the collapsible supports (not shown).

With further specific reference to FIG. 4, two securing clamps 20, 22 are shown, each of the clamps 20, 22 comprised of first and second plates 80, 82. In turn, the first and second plates 80, 82 are have a longitudinal groove 85. To attach the collapsible support (not shown) to a press brake (not shown), the longitudinal grooves 85 are aligned with a portion of the press brake (not shown), and the plates 80, 82 are tightened one to the other like a vise. Bolts 86 positioned on the clamps 20, 22 tighten the plates until the collapsible support (not shown) is secured to the press brake (not shown).

Figure 6:
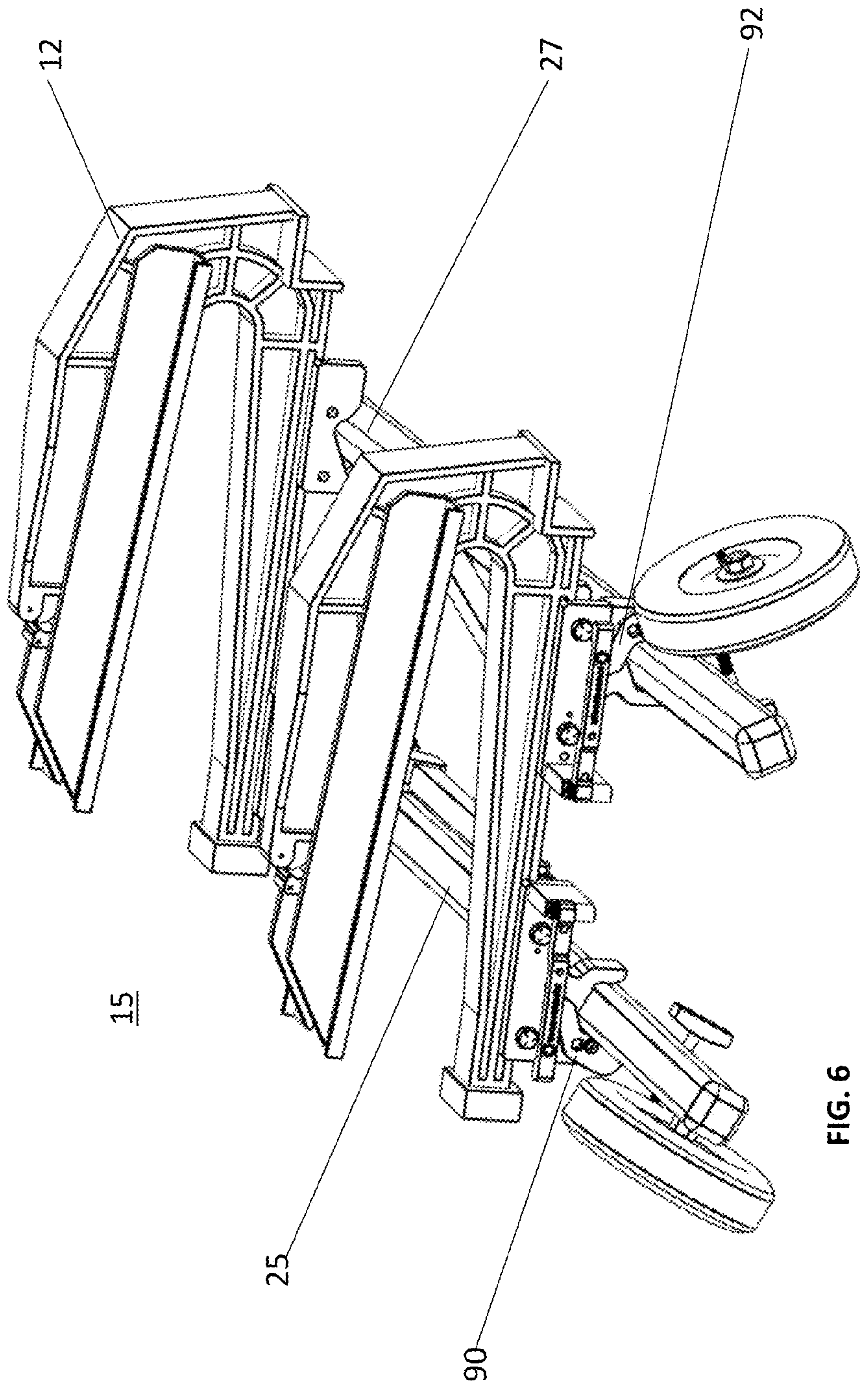
FIG. 6 is a perspective view of the collapsible support secured to the press brake in the folded position, according to an embodiment of the present disclosure.
Figure 7:
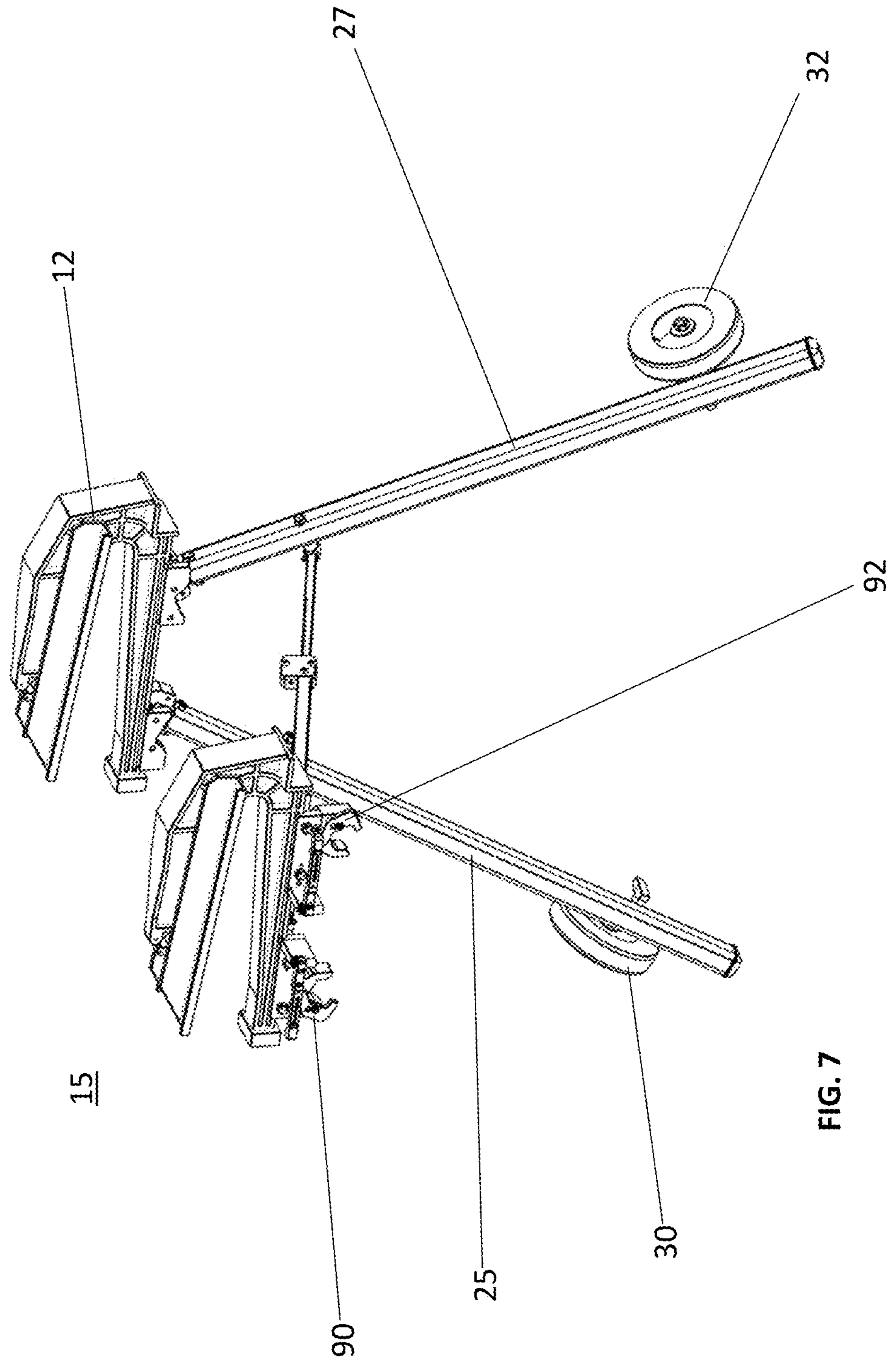
FIG. 7 is a perspective view of the collapsible support secured to the press brake in the extended position, according to an embodiment of the present disclosure.
Figure 8A:
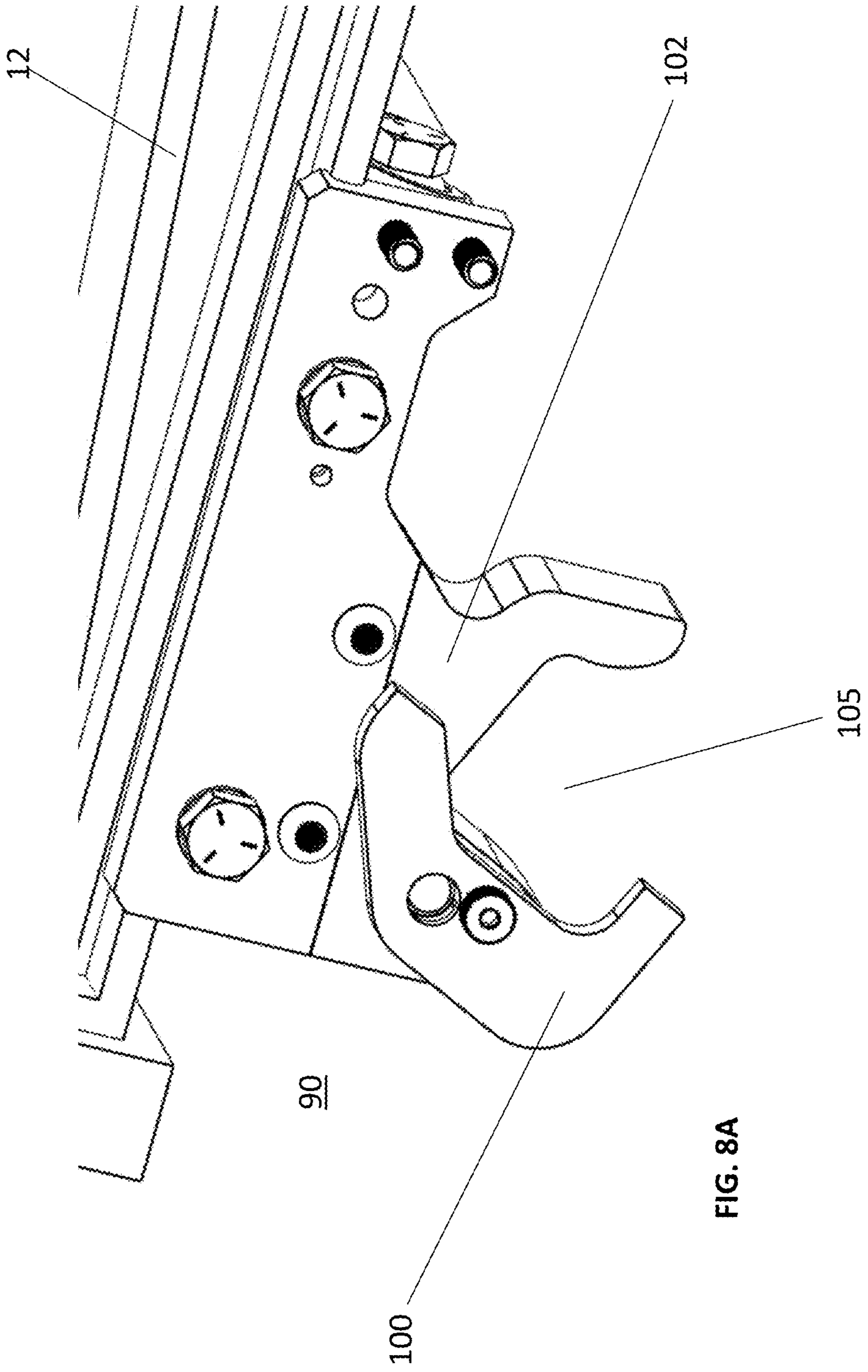
FIG. 8A is an enlarged perspective view of a claw of the collapsible support, according to an embodiment of the present disclosure.
Figure 8B:
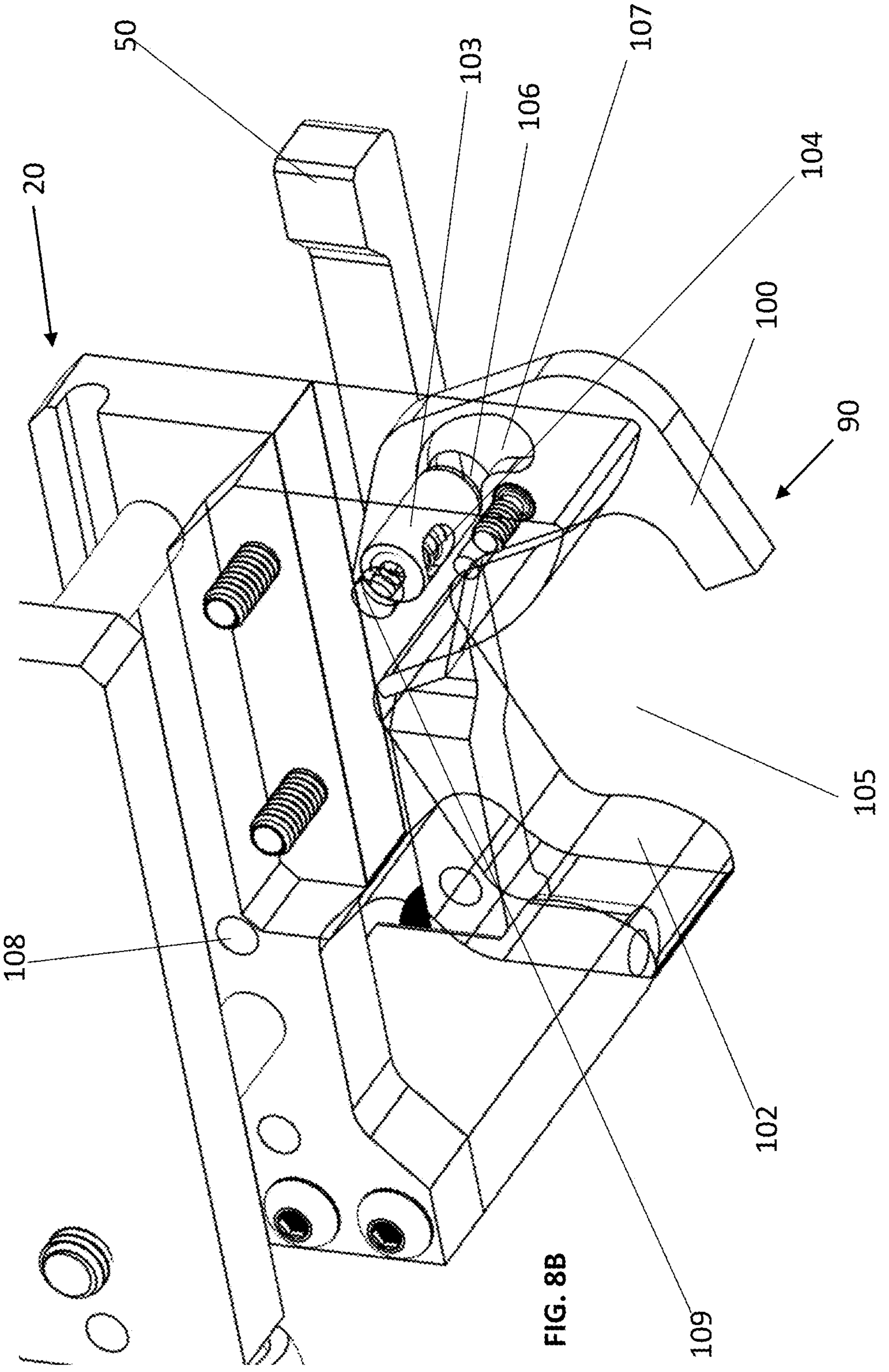
FIG. 8B is an enlarged underside perspective view of a claw of the collapsible support having the stationary portion shown transparently, according to an embodiment of the present disclosure.

With reference to FIGS. 6, 7, 8A and 8B and according to an embodiment of the present disclosure, the collapsible support 15 is shown secured to a portion of a press brake 12 in a folded position (in FIG. 6) and an extended position (in FIG. 7). To properly fold and store the collapsible support 15, adjustable claws 90, 92 are provided to receive each one of the legs 25, 27. Each of the claws 90, 92 are comprised of a pivotable portion 100 and a stationary portion 102. A plunger 103 is positioned inside of the stationary portion 102 of the claws 90, 92, the plunger 103 to receive and secure the second end of the wire (not shown). The plunger 103 is biased by a spring 104, which forces the plunger 103 in or out of an aperture 106 of the track 107 of the pivotable portion 100. As was earlier described, one end of the wire (not shown), which is fitted through handle 50, travels through an opening 108 of the clamp 20 and into another opening 109 of the stationary portion 102. As an operator pulls on the handle 50, the wire (not shown), which is attached to the plunger 103, is pulled backwardly and therefore compresses the spring 104. In turn, this moves the plunger 103 from a locked position in the aperture 106 to an unlocked position as specifically shown in FIG. 8B. The pivotable portion 100 is then no longer locked in place and can pivot with the plunger 103 travelling along track 107. This narrows the space 105 of the claw 90 and allows for the leg 25 to be locked therein. Once the handle 50 is released, the spring 104 biases the plunger 103 back into a locked position in the aperture 106 and the claw 90 is locked in place as best shown in FIG. 6. Once the legs 25, 27 are pivoted into the folding position, the claws 90, 92 are locked to in turn lock the legs 25, 27 into the spaces 105 created by the claws 90, 92.

Figure 9B:
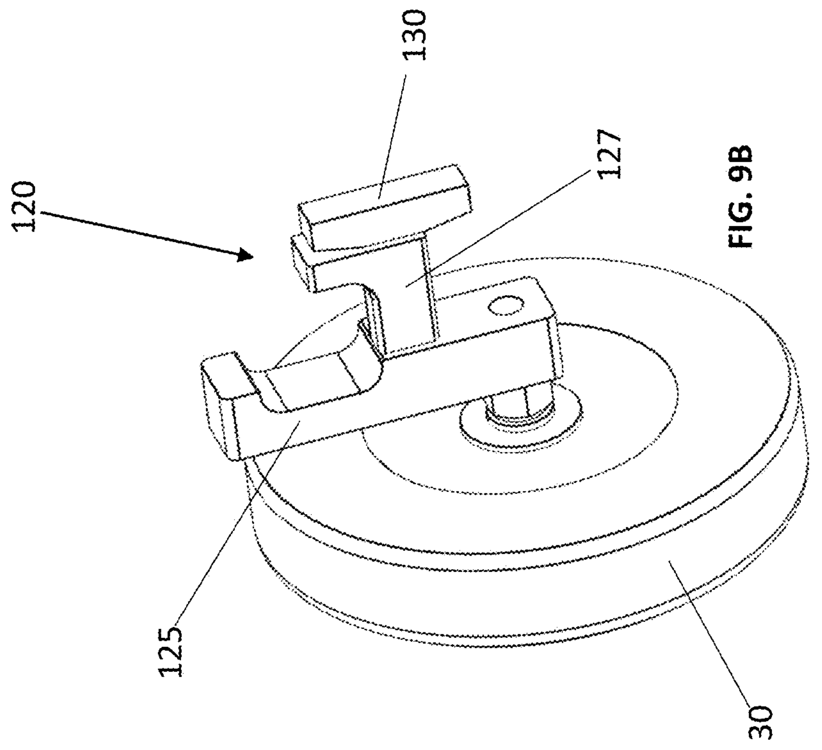
FIG. 9B is a perspective view of the wheel of the collapsible support, according to an embodiment of the present disclosure.
Figure 9A:
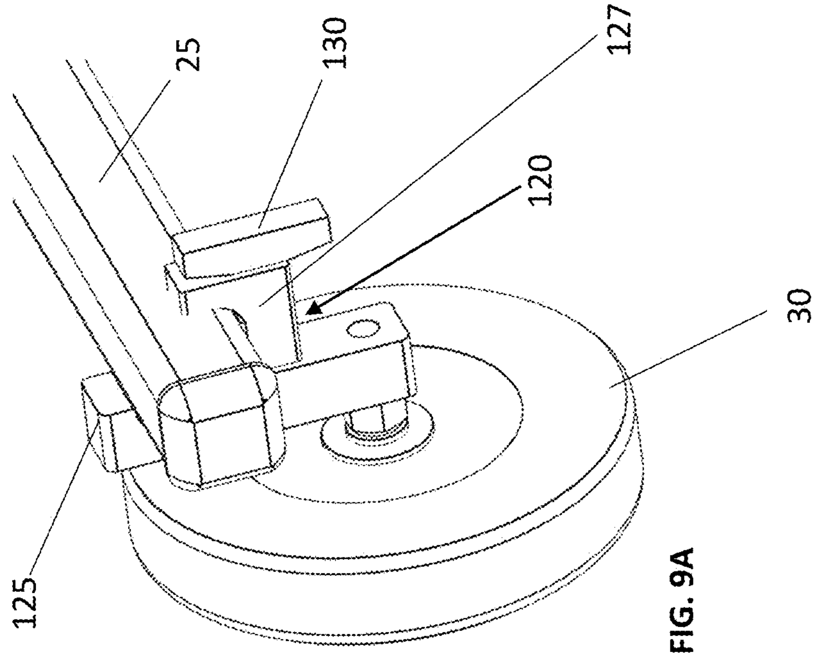
FIG. 9A is a perspective view of a wheel secured to a leg of the collapsible support, according to an embodiment of the present disclosure.
Figure 10:
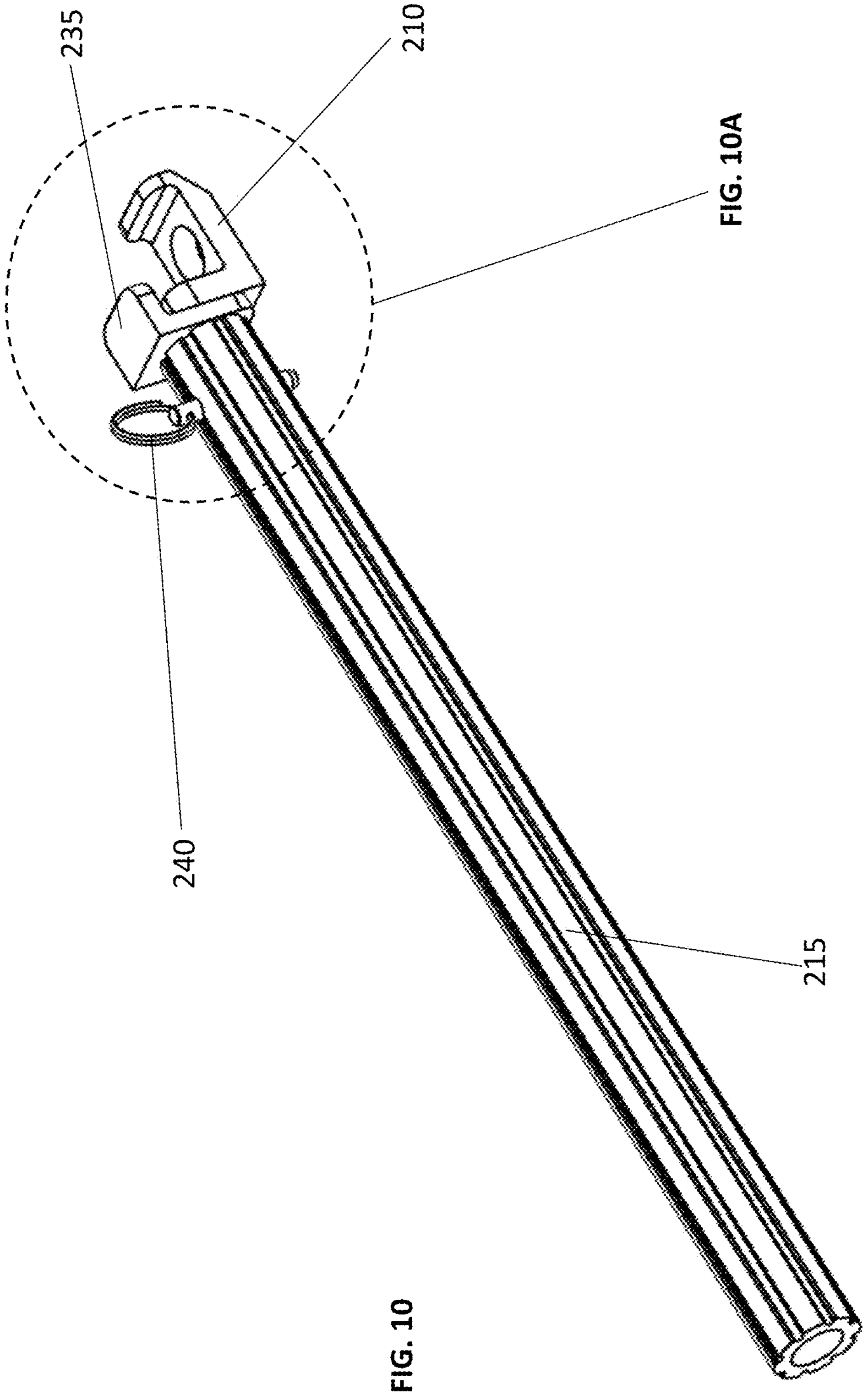
FIG. 10 is a perspective view of a bracket secured to a handle for a press brake, according to an embodiment of the present disclosure.
Figure 10A:
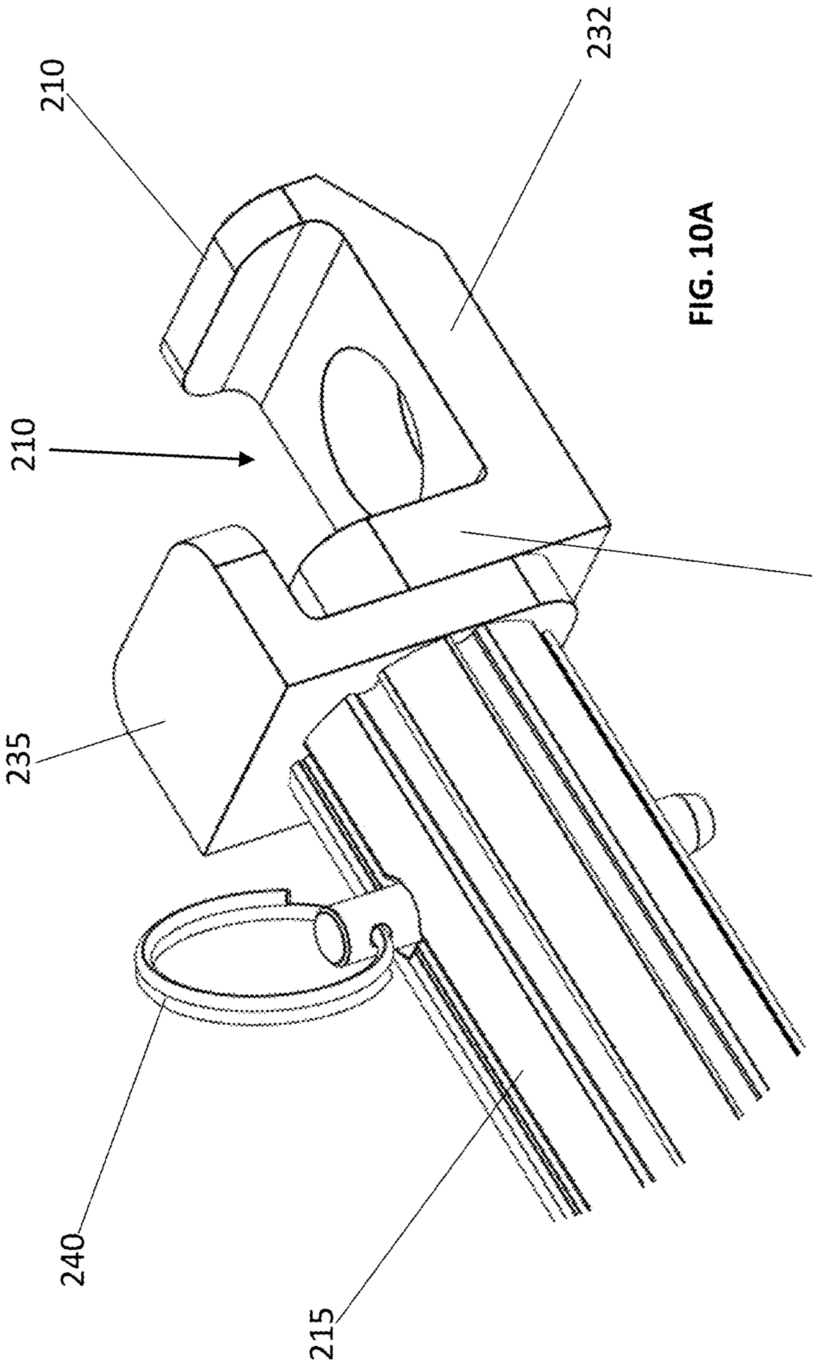
FIG. 10A is an enlarged perspective view taken along the lines in FIG. 10, according to an embodiment of the present disclosure.
Figure 11:
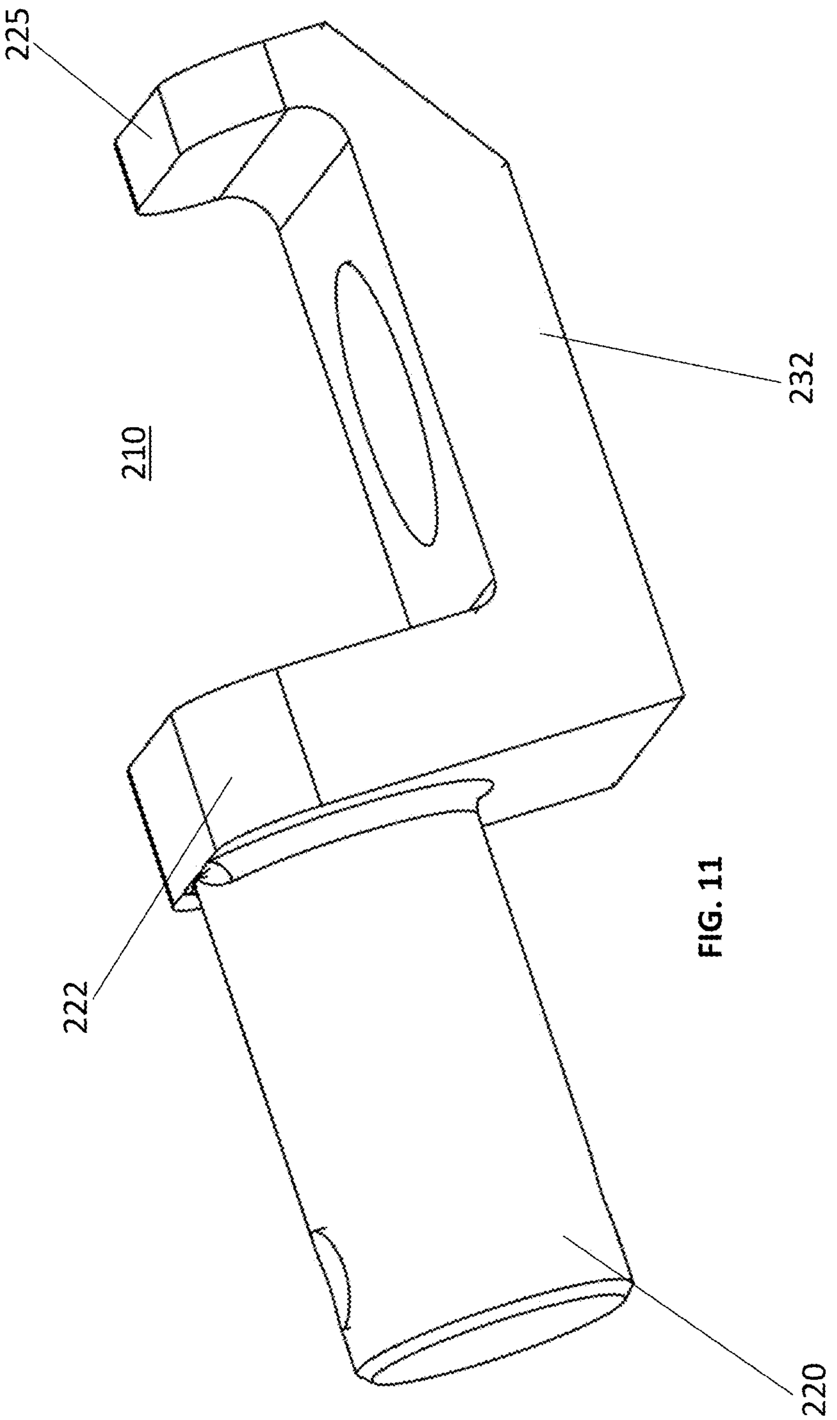
FIG. 11 is an enlarged perspective view of the bracket for a press brake, according to an embodiment of the present disclosure.

With reference to FIGS. 9A and 9B and according to an embodiment of the present disclosure, the removable wheel 30 is shown in greater detail. Specifically, the removable wheel 30 is further comprised of a fastening mechanism 120, the fastening mechanism 120 preferably comprising front and rear portions 125, 127 that serve to tighten and clamp around the leg 30 by means of a screw or bolt 130. Indeed, the bolt 130 or other similar device is screwed into both of the front and rear portions 125, 127, such that continuous turning of the bolt 130 tightens the front portion 125 to the rear portion 127. Once the wheel 30 is secured to the leg 25, the bolt 130 can be loosened for the fastening mechanism 120 and wheel 30 to slide along the length of the leg 25 to quickly and easily transport the press brake (not shown).

Figure 12:
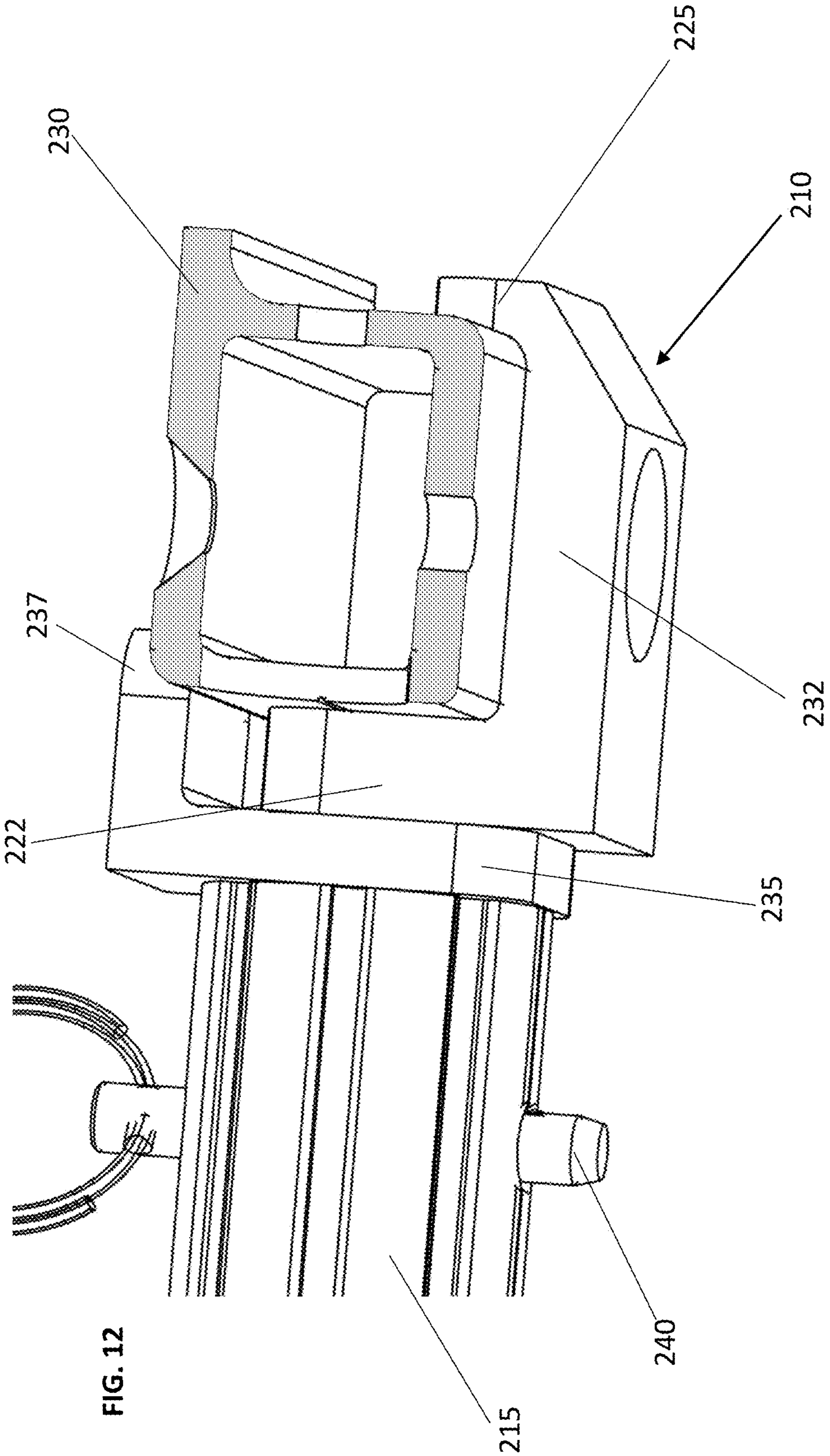
FIG. 12 is an enlarged cross-sectional view of the bracket secured to the press brake and the handle, according to an embodiment of the present disclosure.

With reference to FIGS. 10, 10A, 11 and 12 and according to another embodiment of the present disclosure, a sliding bracket 210 is shown to quickly and easily connect a handle 215 to a section of a press brake 230. The bracket 210 is generally C-shaped, having a dowel portion 220 extending from a front portion 222. The bracket 210 is also comprised of a hook portion 225, which serves to hook into the section of the press brake 230, and a base portion 232 separating the hook portion 225 from the front portion 222. As best shown in FIG. 12, the front portion 222, base portion 232 and hook portion 225 combine to fit flushly on the underside of the press brake 230. Once the bracket 210 is positioned in this manner underneath the press brake 230, an L-bracket 235 is inserted into the dowel portion 220 of the bracket 210. A lip portion 237 of the L-bracket 235 fits flushly over an upper wall of the press brake 230. Such lip portion 237 is required to trap the press brake 230 in between the bracket 210 and the L-bracket 235 during operation of the handle 215. Once the L-bracket 235 is in place, the handle 215 is inserted over the dowel portion 220 and a pin 240 is inserted into an aperture of both the handle 215 and dowel portion 220. The handle 215 is then locked into place relative to the bracket 210 and the handle 215 can be manipulated to slide the bracket 210 along the press brake 230.

Figure 13:
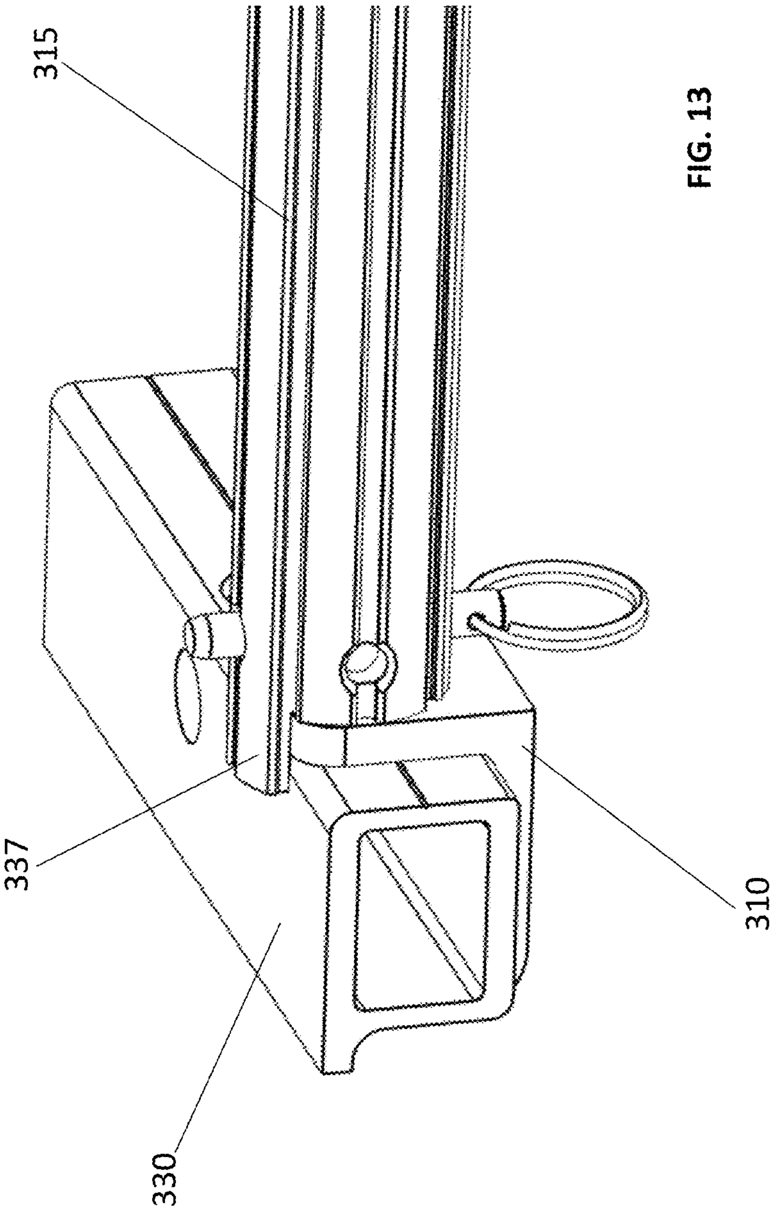
FIG. 13 is an enlarged perspective view of a bracket secured to a press brake and a handle, according to another embodiment of the present disclosure; and, FIG. 14 is a perspective view of an improved tool holder for a press brake, according to an embodiment of the present disclosure.

With reference to FIG. 13 and according to another embodiment of the present disclosure, a bracket 310 is shown without the L-bracket. In this embodiment, the handle 315 is further comprised of a lip portion 337 extending outwardly and over an upper portion of the press brake 330, to trap the press brake 330 in between the bracket 310 and the handle 315 during operation of the press brake 330.

Figure 14:
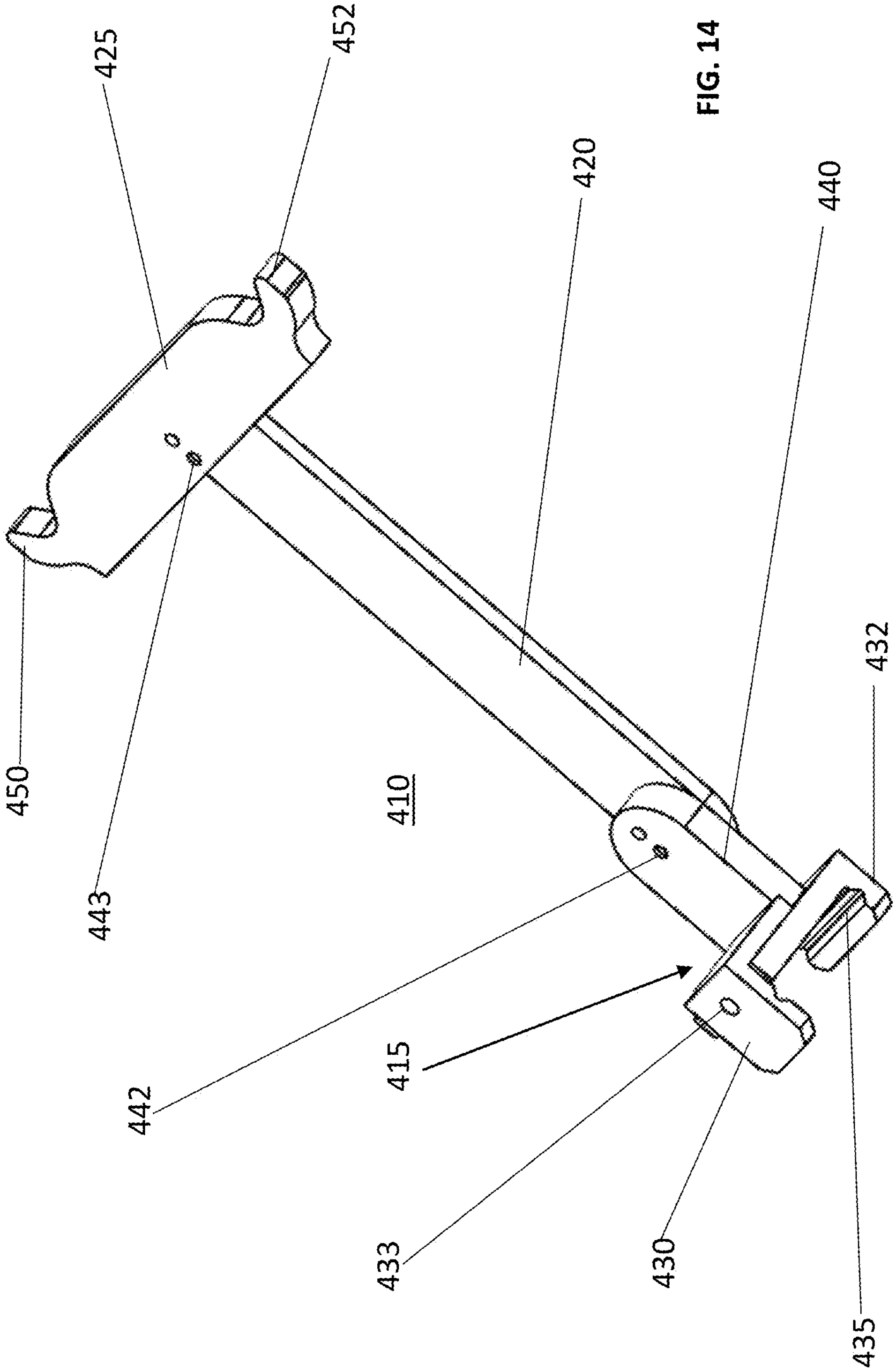

With reference to FIG. 14 and according to another embodiment of the present disclosure, an improved tool holder 410 is shown preferably constructed for use with a press brake (not shown). The improved tool holder 410 is preferably comprised of a lower clamp 415, a main body 420 and upper hook 425. The lower clamp 415 is further comprised of two opposed plates 430, 432, the plates 430, 432 constructed to be tightened together like a vise by means of bolt (not shown) fastened into each of the plates 430, 432 through aperture 433. Each of the plates 430, 432 are comprised of an inner longitudinal slit 435 that serves to mate with a corresponding shape of the press brake (not shown). The lower clamp 415 is further comprised of a joint 440 that is in pivotal engagement with the main body 420 by means of a first pin 442. As such, during use of the tool holder 410, the main body 420 can pivot independently from the upper joint 440. In turn, the lower clamp 415 can pivot about pin 442. The main body 420 is in pivotal engagement with the upper hook 425 by means of second pin 443. Therefore, the main body 420 can itself pivot independently from the upper hook 425. The upper hook 425 is further comprised of two opposed catches 450, 452 to mate with various tools of other equipment used in the field.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. A collapsible support comprising:

a securing clamp to secure the support to a surface;

at least two legs secured to the securing clamp, the at least two legs to support and transport the surface;

at least two telescopic arms, each one of the at least two telescopic arms secured to one of the at least two legs to allow the at least two legs to pivot about an axis; and, an actuating mechanism connected to the at least two telescopic arms to lock and release the at least two legs, the actuating mechanism comprising:

two handles; and, two claws to receive and lock the at least two legs, wherein the support has a range of motion in between a first extended position to a second folded position.

2. The support of claim 1 wherein the two claws are further comprised of a plunger and a spring adapted to receive an actuating wire, and wherein movement of the of two handles correspondingly actuates the two claws to lock and unlock the at least two legs.

3. The support of claim 2 wherein the plunger travels along a track of the two claws, the track having an aperture, the plunger being lockable in the aperture.

4. The support of claim 1 wherein the at least two telescopic arms are further comprised of a releasing bracket.

5. The support of claim 4 wherein the releasing bracket is further comprised of:

an angular slider;

a spring; and a locking peg, wherein the angular slider, spring and locking peg cooperate with inner rods of the at least two telescopic arms to adjust a length of the at least two telescopic arms.

6. The support of claim 1 wherein the at least two legs terminate in a removable wheel.

7. The support of claim 6 wherein the removable wheel is further comprised of a fastening mechanism to tighten and loosen around the at least two legs.

8. A collapsible support comprising:

a securing clamp to secure the support to a surface;

at least two legs secured to the securing clamp, the at least two legs to support and transport the surface;

at least two telescopic arms, each one of the at least two telescopic arms secured to one of the at least two legs to allow the at least two legs to pivot about an axis, the at least two telescopic arms further comprising a releasing bracket, the releasing bracket comprising:

an angular slider;

a spring; and a locking peg, wherein the angular slider, spring and locking peg cooperate with inner rods of the at least two telescopic arms to adjust a length of the at least two telescopic arms; and, an actuating mechanism connected to the at least two telescopic arms to lock and release the at least two legs, wherein the support has a range of motion in between a first extended position to a second folded position.

9. The support of claim 8 wherein the actuating mechanism is further comprised of:

two handles; and, two claws to receive and lock the at least two legs.

10. The support of claim 9 wherein the two claws are further comprised of a plunger and a spring adapted to receive an actuating wire, and wherein movement of the of two handles correspondingly actuates the two claws to lock and unlock the at least two legs.

11. The support of claim 10 wherein the plunger travels along a track of the two claws, the track having an aperture, the plunger being lockable in the aperture.

12. The support of claim 8 wherein the at least two legs terminate in a removable wheel.

13. The support of claim 12 wherein the removable wheel is further comprised of a fastening mechanism to tighten and loosen around the at least two legs.

* * * * *